United States Patent
Lee

(10) Patent No.: US 6,281,805 B1
(45) Date of Patent: Aug. 28, 2001

(54) AUTOMOTIVE CCD CAMERA

(75) Inventor: Dong-Min Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/615,277

(22) Filed: Jul. 13, 2000

(30) Foreign Application Priority Data

Dec. 3, 1999 (KR) .................................................. 99-54761

(51) Int. Cl.[7] .................................................. G08G 1/00
(52) U.S. Cl. .................. 340/901; 348/32; 348/33; 348/148; 382/104; 382/103; 382/260
(58) Field of Search .................. 340/901, 903, 340/904, 937; 356/51; 364/461, 424.02; 348/32, 33, 34, 148, 162; 359/350, 351, 352, 361, 498; 382/102, 103, 104, 260, 261, 262, 263, 264

(56) References Cited

U.S. PATENT DOCUMENTS

| | | | |
|---|---|---|---|
| 4,970,653 | * 11/1990 | Kenue | 364/461 |
| 5,661,472 | * 8/1997 | Koshizawa | 340/901 |
| 5,892,855 | * 4/1999 | Kakinami et al. | 382/291 |
| 6,038,496 | * 3/2000 | Dobler et al. | 340/436 |
| 6,115,175 | * 9/2000 | Maruyama et al. | 359/355 |

* cited by examiner

Primary Examiner—Jeffery Hofsass
Assistant Examiner—Daniel Previl
(74) Attorney, Agent, or Firm—Christie, Parker & Hale, LLP

(57) ABSTRACT

An automotive CCD camera includes a UV filter receiving light corresponding to lane images and filtering through ultraviolet light, a condenser condensing the UV light filtered through the UV filter and transmitting the light, and a light disperser dispersing the light transmitted by the condenser to output the light through at least two different paths. A CCD cell assembly receives the light dispersed by the light disperser, photographs the same and outputs light signals. An adder adds the light signals output by the CCD cell assembly and outputs image signals in which yellow lane markers can be extracted.

3 Claims, 2 Drawing Sheets

AUTOMOTIVE CCD CAMERA

BACKGROUND OF THE INVENTION (a) Field of the Invention

The present invention relates to an automotive CCD camera, and more particularly, to an automotive CCD camera used in a lane drift prevention system that enables yellow lane markers to be precisely detected.

(b) Description of the Related Art

In a charge coupled device (CCD) camera, a thin insulating later (e.g., a silicon oxide layer) is deposited on a surface of a semiconductor element, and a plurality of crystalline silicone electrodes is arranged in a row on the semiconductor element. A light diode is provided adjacent to each electrode. If light contacts the light diodes, the light diodes generate electrons and the electrons move in the area of the semiconductor element. Also, if a voltage pulse is applied in sequence to each of the electrodes, a potential in the semiconductor element is transmitted as with a match-bucket relay. Accordingly, the CCD is able to convert optical image data into electric signals. As a result of this capability, the CCD is used in video cameras, facsimile machines, copiers, etc.

A conventional lane drift prevention system is able to recognize lane markers in the road and warn the driver of any departure from the lane or, as in the case of an intelligent transport system (ITS) or intelligent highway system, automatically control the vehicle so that it is maintained in the lane. A conventional system employing the CCD camera will now be described.

With reference to FIGS. 1 and 2, a CCD camera 1 is provided in a position to enable the collection of images of the road in front of the vehicle. Signals corresponding to the road images are transmitted to an ECU 2 by the CCD camera 1, and the ECU 2 processes the image signals to determine if the vehicle is drifting out of the lane. If it is determined that the vehicle is veering from the lane, the ECU 2 operates a drive control system 3 which controls the vehicle so that it returns to a position between the lane markers.

As shown in FIG. 3, the conventional CCD camera comprises a UV filter 10, a condenser 20 and a CCD cell 30. The images collected by the CCD camera are black and white images. Color images are not collected so that the detection of the lane can be performed at a process speed corresponding to the speed at which the vehicle is travelling.

Since the CCD camera used in lane drift prevention systems collects images of the lane using only light travelling in a straight path, the camera has only a limited ability to recognize yellow lane markers. This is a serious restriction in consideration of the widespread use of yellow lane markers.

SUMMARY OF THE INVENTION

The present invention has been made in an effort to solve the above problems.

It is an object of the present invention to provide an automotive CCD camera used in a lane drift prevention system that enables yellow lane markers to be precisely detected.

To achieve the above object, the present invention provides an automotive CCD camera comprising a UV filter receiving light corresponding to lane images and filtering through ultraviolet light; a condenser condensing the UV light filtered through the UV filter and transmitting the light; a light disperser dispersing the light transmitted by the condenser to output the light through at least two different paths; a CCD cell assembly receiving the light dispersed by the light disperser, photographing the same and outputting light signals; and an adder adding the light signals output by the CCD cell assembly and outputting image signals in which yellow lane markers can be extracted.

According to a feature of the present invention, the light disperser is a polarizing filter.

According to another feature of the present invention, the CCD cell assembly comprises a first CCD cell receiving the light condensed by the condenser through a first path, photographing the light and outputting first image signals to the adder; a second CCD cell receiving the light condensed by the condenser through a second path, photographing the light and outputting second image signals to the adder; and a third CCD cell receiving the light condensed by the condenser through a third path, photographing the light and outputting third image signals to the adder.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
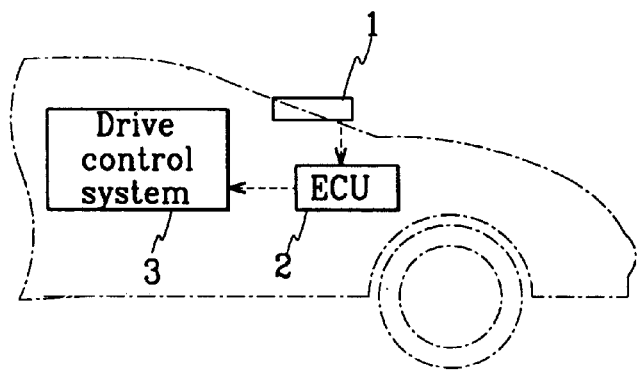
FIG. 1 is a schematic view of a conventional lane drift prevention system.
Figure 2:
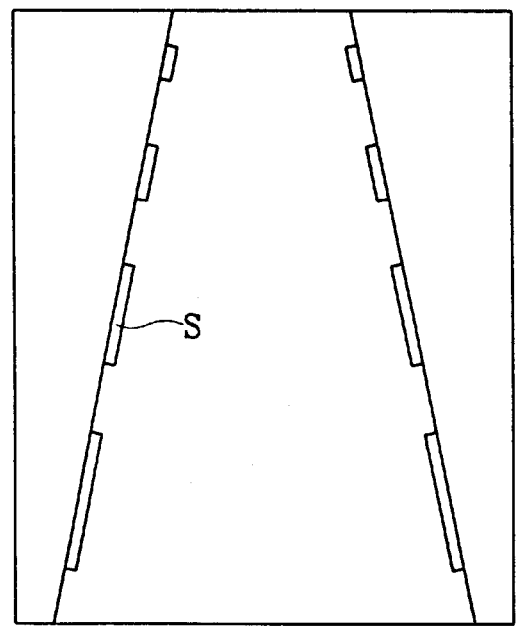
FIG. 2 is a typical image taken by a CCD camera of the conventional lane drift prevention system.
Figure 3:
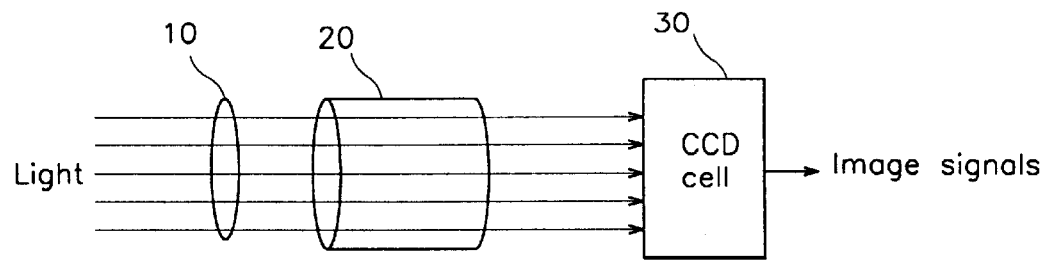
FIG. 3 is a schematic view of a conventional CCD camera.
Figure 4:
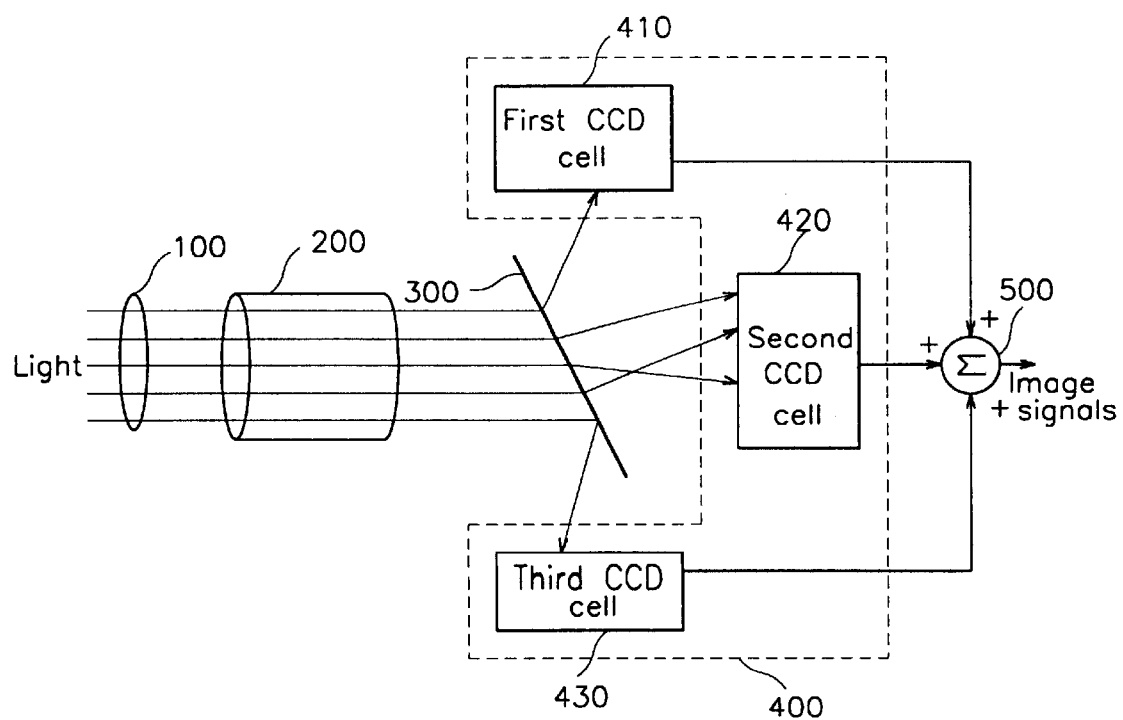
FIG. 4 is a schematic view of a CCD camera according to a preferred embodiment of the present invention.

FIG. 4 shows a schematic view of a CCD camera according to a preferred embodiment of the present invention.

The CCD camera includes a UV filter 100, a condenser 200, a light disperser 300, a CCD cell assembly 400 and an adder 500.

The UV filter 100 receives light corresponding to the lane in which the vehicle is driving, filters through ultraviolet rays then performs an output to the condenser 200. Ultraviolet rays have a wavelength shorter than purple light but longer than X-rays, falling in the range of 400–100 nm. Ultraviolet rays can be classified into near infrared rays (400–300 nm), far infrared rays (300–200 nm), vacuum infrared rays, and extreme infrared rays (200–1 nm).

The condenser 200 condenses the ultraviolet rays supplied from the UV filter 100 then transmits the light to the light disperser 300. The light disperser 300 is a triangular prism and acts as a polarizing filter. The light disperser 300 disperses the ultraviolet light condensed by the condenser 200 into a plurality of paths to be supplied to the CCD cell assembly 400.

The polarization of light will now be briefly described.

Light waves having uniform vibration, that is electromagnetic waves, are transverse waves such that the direction of vibration of the waves is perpendicular to the direction at which the waves travel. Light typically is comprised of such waves that vibrate in a direction perpendicular to the direction at which the light travels. However, there is also light in which the direction of vibration and direction of travel are inclined, and such a phenomenon is referred to as polarization.

Light in which the vibration is limited to only one direction is referred to as linear or planar polarization. Linear polarization is obtained by the reflection of light off a surface of a clear object at an incident angle or by transmitting light through a polarizer.

Light vectors draw a wave on a single planar surface according to the progression of light from linear polarization. But ends of the vectors are circularly polarized such that circular spirals are drawn and elliptically polarized so that elliptically polarized spirals are drawn.

In this way, the light disperser 300 disperses not only linear but also curved light into a plurality of different paths to be transmitted to the CCD cell assembly 400. Since yellow level light components in linear light are weaker than other level light components, by dispersing also light components having curved properties, all light component levels are dispersed to enable better extraction of yellow light.

The CCD cell assembly 400 includes first, second and third CCD cells 410, 420 and 430. The first, second and third CCD cells 410, 420 and 430 receive first, second and third image signals, respectively, dispersed by the light disperser 300, and perform photographing of the image signals, after which the photographed image signals are supplied to the adder 500 respectively through first, second and third passages.

The adder 500 adds the image signals received from the first, second and third CCD cells 410, 420 and 430 of the CCD cell assembly 400, and outputs image signals in which yellow lane markers can be detected. At this time, since all light component levels are included in the image signals output by the adder 500, the extraction of also yellow lane markers is possible.

In the automotive CCD camera used in a lane drift prevention system of the present invention described above, by using light having both curved and linear properties, yellow light components, which are weaker than other colors, can be extracted, enabling the full detection of yellow lane markers.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An automotive CCD camera comprising:
   a UV filter receiving light corresponding to lane markers and filtering UV light;
   a condenser condensing the UV light filtered through the UV filter;
   a light disperser dispersing the UV light condensed by the condenser to output at least one light through at least two different paths;
   a CCD cell assembly converting the light input through the at least two different by the light disperser into image signals; and
   an adder adding the image signals output by the CCD cell assembly and outputting image signals in which yellow lane markers can be extracted.

2. The automotive CCD camera of claim 1 wherein the light disperser is a polarizing filter.

3. The automotive CCD camera of claim 1 wherein the CCD cell assembly comprises:
   a first CCD cell receiving the light condensed by the condenser through a first path, photographing the light and outputting first image signals to the adder;
   a second CCD cell receiving the light condensed by the condenser through a second path, photographing the light and outputting second image signals to the adder; and
   a third CCD cell receiving the light condensed by the condenser through a third path, photographing the light and outputting third image signals to the adder.

* * * * *